Aug. 21, 1945. S. G. DOWN 2,383,242
BRAKE CYLINDER RELEASE MEANS
Filed Aug. 12, 1943
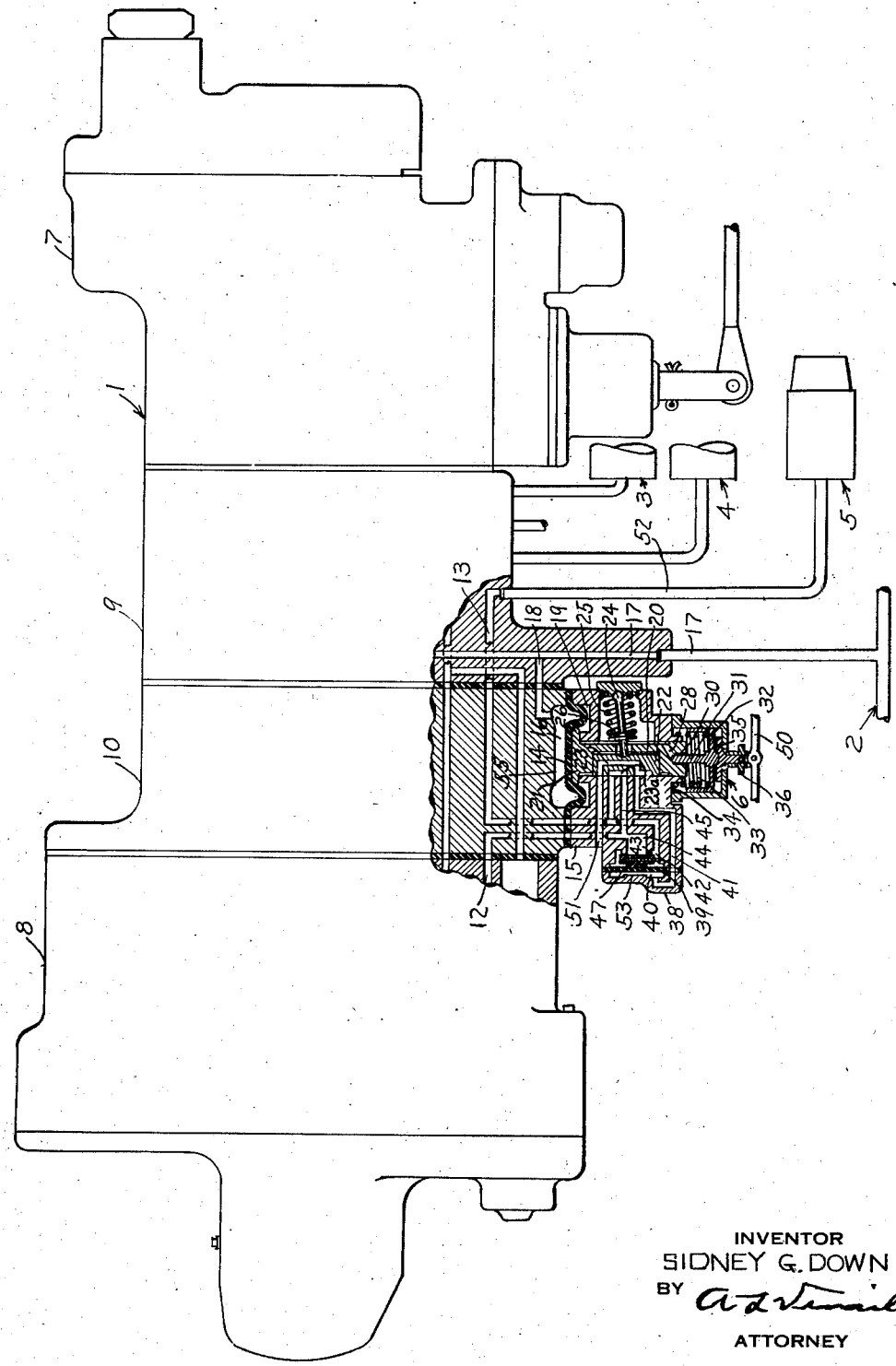
INVENTOR
SIDNEY G. DOWN
BY
ATTORNEY Patented Aug. 21, 1945

2,383,242

UNITED STATES PATENT OFFICE 2,383,242

BRAKE CYLINDER RELEASE MEANS

Sidney G. Down, Edgewood, Pa., assignor to The Westinghouse Air Brake Company, Wilmerding, Pa., a corporation of Pennsylvania Application August 12, 1943, Serial No. 498,324

13 Claims. (Cl. 303—68)

This invention relates to fluid pressure brake apparatus and more particularly to means for releasing the brakes on a car preparatory to setting it out of a train for switching.

When the car equipped with automatic brake equipment and having its reservoir or reservoirs charged with fluid under pressure is cut out of a train and the brake pipe on the car is vented, the triple valve or the like moves to emergency position in which communication is opened between the reservoir or reservoirs and the brake cylinder device. The pressure of fluid in the reservoir or reservoirs then equalizes into the brake cylinder device and effects an emergency application of the brakes on the car. To release this brake application so that the car may then be moved, it has been customary for a trainman to operate the reservoir release valve or valves to completely dissipate the fluid pressure from the usual reservoir or reservoirs and thereby from the connected brake cylinder device. This operation not only wastes the stored fluid pressure in the reservoirs but also requires time on the part of the trainman, since he must hold the reservoir release valve or valves open until the brakes are released. When the car is subsequently placed in a train, it is then necessary to completely recharge the reservoir or reservoirs either by a local yard plant or by a coupled locomotive before the train may be moved. This requires a relatively long period of time and consequent excessive use and wear of apparatus to accomplish same, all of which is undesirable.

The principal object of the invention is to provide novel brake release means which is operative to release the brakes on a car, when the car is cut out of a train, without dissipating the stored fluid pressure in the reservoir or reservoirs.

Brake release means heretofore proposed for accomplishing this result includes a slide valve arranged to control communication between the brake controlling valve device and the brake cylinder. This communication must be relatively unrestricted so that the desired rate of increase in brake cylinder pressure will not be impaired. Since the build-up in brake cylinder pressure must be at a relatively fast rate it will be understood that the fluid conducting cavities or passages disposed in the slide valve must be large and relatively unrestricted, thus requiring an excessively large slide valve. A large slide valve is objectional in that it requires the associated parts of the release valve device to be large, cumbersome and costly.

A more specific object of the invention is to provide improved compact and inexpensive brake releasing means of the slide valve type which will render it possible to employ a relatively small slide valve and yet not interfere with the brake cylinder build-up time when a brake application is effected.

In the present embodiment of the invention this object is accomplished by means of brake releasing apparatus including a releasing valve device having a slide valve and a by-pass passage provided with a check valve. This brake releasing valve device normally permits flow of fluid under pressure from the brake controlling valve device and thereby the connected reservoirs to the brake cylinder through a port in the slide valve and in addition through the by-pass passage, the by-pass passage being of a flow area sufficiently large to permit the desired rate of increase in brake cylinder pressure, and the port in the slide valve being of much smaller flow area but sufficient to permit the normal release of the brakes. The apparatus is manually operative to disconnect the brake controlling valve device and thereby the reservoir from the brake cylinder and to at the same time connect the brake cylinder to the atmosphere to effect a release of the brakes as will hereinafter more fully appear.

Other objects and advantages will be apparent from the following more detailed description of the invention.

In the accompanying drawing the single figure is a diagrammatic view, partly in section, of an "AB" brake equipment having associated therewith a brake releasing valve device embodying the invention.

As shown in the drawing the brake equipment comprises a brake controlling valve device 1, a brake pipe 2, an auxiliary reservoir 3, an emergency reservoir 4, a brake cylinder 5 and a brake releasing valve device 6.

The brake controlling valve device 1 comprises a service portion 7, an emergency portion 8 and a pipe bracket 9 which portions may be of substantially the same construction as similar portions of the "AB" valve device fully described in the patent to Clyde C. Farmer, No. 2,031,213 issued February 18, 1936, and in view of this it is deemed unnecessary to show and describe these parts in detail. For convenience in making the incorporation of the releasing valve device 6 optional said releasing valve device is in the present invention carried by a filling piece 10 interposed between the pipe bracket 9 and the emergency portion 8. Obviously the brake releasing valve device 6 might be made integral with some part of the brake controlling valve device or might be made as a separate device and connected to the brake controlling valve device by means of pipes if so desired.

In the present standard "AB" valve device shown and described in the aforementioned patent, the usual brake cylinder passage 12 in the emergency portion 8 is in constant and direct communication with the brake cylinder connection or passage 13 in the pipe bracket 9. According to the present invention, the passage 12 and the brake cylinder passage 13 have extensions in the filling piece 10 which lead to the brake releasing valve device 6 for a purpose hereinafter described.

The releasing valve device 6 comprises a flexible diaphragm 14 which is clamped between the filling piece 10 and a casing 15 in any suitable manner. At one side of the diaphragm 14 there is a chamber 16 which is in constant open communication with the usual brake pipe connection 17 in the pipe bracket 9 by way of a passage 18, a portion of the passage being formed in the filling piece 10.

At the opposite side of the diaphragm there is a valve chamber 19. Contained in this chamber is a stem 20 having at one end an enlarged portion 21 constructed and arranged for engagement with the diaphragm. The stem 20 is notched to receive a small slide valve 22 which is provided with cavities 23 and 23a for a purpose hereinafter described.

For maintaining the slide valve 22 in engagement with its seat, a toggle leading mechanism is provided. This mechanism comprises a rocking or yielding strut 24 which seats at one end in a cavity on the back of the slide valve and is urged toward the slide valve by means of a spring 25 which is interposed between a collar 26 carried by the strut and the casing. This rocking or yielding strut 24 acts as a toggle biasing the slide valve 22 moderately toward whichever position it occupies, i. e., its upper or lower position.

The valve chamber 19 is vented through a passage 28 which may for convenience be formed in the stem 20. This passage leads to a central bore 30 provided in the lower end of the stem. The bore 30 is arranged to freely receive a stem 31 carried by a plunger 32 which is maintained in its lower position, as shown in the drawing, by means of a spring 33 interposed between the plunger and a wall 34 of the casing. Beneath the plunger 32 is a rocking element 35 having a member 36 which extends to the exterior of the casing and which when rocked by means of a rod 50 from either side of the car forces the plunger, diaphragm stem 20 and slide valve 22 upwardly as a unit.

Interposed between the casing 15 and a cap member 38 is a flexible diaphragm 39. At one side of this diaphragm there is a chamber 40 which is in constant open communication with a passage 41 which leads to the seat for the slide valve 21. At the opposite side of the diaphragm 39 there is a chamber 42 having formed therein a seat rib 43. Within this seat rib is a chamber 44 which is in constant open communication with a passage 45 leading to the seat for the slide valve 22, and is also in constant open communication with passage 12, a portion of the passage 12 being formed in the filling piece 10 and the casing 15 of the releasing valve device 6. The chamber 44 is connected outside the seat rib 43 to the brake cylinder connection 13 in the pipe bracket, a portion of passage 13 being formed in the filling piece 10 and the casing 15 of the releasing valve device 6.

Contained in chamber 42 is a valve 47 which is normally maintained in seating engagement with the seat rib 43 by the diaphragm 39 as shown in the drawing.

When a car equipped with the brake apparatus just described is connected in a train, fluid under pressure is supplied to the brake pipe 2 in the usual manner. Fluid under pressure thus supplied to the brake pipe flows through pipe and passage 17 to the several chambers of the brake controlling valve device 1 which are to be charged and to the auxiliary and emergency reservoirs 3 and 4, respectively, in the usual manner.

From passage 17 fluid under pressure also flows to chamber 16 by way of passage 18. With chamber 16 charged with fluid at brake pipe pressure, the diaphragm 14, through the medium of the stem 20, maintains the slide valve 22 in its normal position, in which position it is shown in the drawing. With the slide valve 22 in this position, the chamber 40 in the brake releasing valve device 6 and the brake cylinder 5 are connected to the atmosphere. The connection from chamber 40 to the atmosphere is by way of passage 41, cavity 23 in the slide valve 22 and an atmospheric passage 51. The connection from the brake cylinder 5 to the atmosphere is by way of a pipe 52, brake cylinder passage 13, cavity 23a of relatively small flow area, in the side valve 22, passage 12 and through the usual exhaust path not shown in the brake controlling valve device 1, so that the brakes on the vehicle will be released.

When the pressure of fluid in the brake pipe 2 is reduced at a service rate to effect a service application of the brakes the brake controlling valve device 1 operates in the usual manner to supply fluid under pressure from the auxiliary reservoir 3 to the passage 12, and when a reduction in pressure in brake pipe is made at an emergency rate to effect an emergency application of the brakes said valve operates to supply fluid under pressure from both the auxiliary reservoir 3 and the emergency reservoir 4 to passage 12.

In either event fluid under pressure thus supplied to passage 12 flows therefrom to chamber 44 in the brake releasing valve device 6 from whence it may flow through two paths to the brake cylinder 5, one path being by way of passage 45, cavity 23a in the slide valve 22, brake cylinder passage 13 and pipe 52, and the other path being by way of passage 12 of relatively large flow area past valve 47, chamber 42, brake cylinder passage 13 and pipe 52.

It will be understood that with the chamber 40 vented to the atmosphere through the circuit hereinbefore traced, the pressure of fluid in chamber 44 and acting on the valve 47 within the seat rib 43 causes the valve to move in a direction toward the left-hand out of engagement with its seat 43 until brought to a stop by the diaphragm 39 engaging a stop 53 on the cap 38.

When a subsequent increase in brake pipe pressure is made to effect a release of the brakes following either a service or an emergency application the brake controlling valve device 1 functions in the usual well known manner to connect passage 12 and thereby connected chamber 44 in the releasing valve device 6 to the atmosphere. With the chamber 44 connected to the atmosphere, the pressure of fluid in chamber 42 and acting over the entire area of the valve 47 causes said valve to move into engagement with the seat rib 43 and thus cut off communication between chambers 44 and 42. With communication between these chambers cut off fluid under pressure is released from the brake cylinder 5 by way of pipe 52, brake cylinder connection 13, cavity 23a in the slide valve 22 and chamber 44.

It should here be mentioned that the cavity 23a in the slide valve 22 need only have sufficient flow area to permit the release of fluid from the brake cylinder over a predetermined period of time when effecting a release of the brakes which in the "AB" brake equipment is approximately twenty-two seconds.

From the foregoing description it will be understood that the brakes may be applied and released in the usual well known manner without any interference by the releasing valve device 6, and that the slide valve 22 may be small since it does not have to accommodate ports of great enough flow area to provide for the relatively rapid increase in brake cylinder pressure required when an application of the brakes is effected.

If a car provided with the apparatus shown in the accompanying drawing is cut out of a train and the brake pipe 2 is vented, the brake controlling valve device 1 will operate to cause an emergency application of the brakes in the same manner as hereinbefore described.

With the brakes on the car thus applied in emergency and the brake pipe 2 and consequently connected chamber 16 vented, let it be assumed that it is desired to release fluid under pressure from brake cylinder 5 to effect a release of the car brakes, without recharging the brake pipe 2 and without losing the stored fluid pressure in the auxiliary and emergency reservoirs 3 and 4, respectively.

To accomplish this the trainman, through the operation of the rod 50 from either side of the car, rocks the member 36, thus causing the plunger 32 to move upwardly against the opposing pressure of spring 33, causing the plunger 32 to move the diaphragm stem 20 and attached slide valve 22 upwardly and thereby causing the diaphragm 14 to deflect in the same direction until it is brought to a stop by its engagement with a stop 55 on the casing.

It will be understood that this upward movement of the slide valve causes the rocking or yielding strut 24 to rock in a clockwise direction and as the strut passes its dead center the spring 25 acts to bias the slide valve upwardly. When this upward movement of the stem and attached slide valve 22 is brought to a stop by the diaphragm engaging the stop 55, the slide valve 22 will be in a position in which cavity 23 connects passage 41 to passage 45 and cavity 23a connects brake cylinder connection 13 to passage 51. With communication between passages 45 and 41 thus established, the pressure of fluid in passage 12 and connected auxiliary and emergency reservoirs 3 and 4, respectively, flows to chamber 40 by way of chamber 44, passage 45, cavity 23 in the slide valve 22 and passage 41. Fluid under pressure thus supplied to chamber 40 acts on the outer face of diaphragm 39 and thereby on the outer side of valve 47 and overcomes the opposing pressure acting on the opposite side of the valve in chamber 44 within the seat rib 43 thus causing the valve to move into seating engagement with the seat rib 43. With this valve thus seated communication between chamber 44 and 42 and thereby between the brake controlling valve device 1 and connected auxiliary and emergency reservoirs and the brake cylinder 5 is cut off.

With communication between passage 51 and the brake cylinder passage 13 established the brake cylinder will be vented to the atmosphere to effect a release of the brakes by way of pipe 52, brake cylinder passage 13, cavity 23a in the slide valve 22 and atmospheric passage 51.

It follows that the brake cylinder 5 is vented to the atmosphere and the communication between passage 12 and brake cylinder passage 13 and thereby the brake controlling valve device 1 and the brake cylinder 5 is blanked thus providing for a release of the brakes without losing the fluid pressure stored in the auxiliary and emergency reservoirs 3 and 4, respectively.

It should here be mentioned that since the toggle loading mechanism acts to bias the slide valve to the position to which it has been moved the trainman may release pressure from the rod 50 and proceed with other duties just as soon as fluid under pressure from the brake cylinder starts to release.

Now when the car is cut into a train and the pressure in the brake pipe 4 is increased the pressure in the connected chamber 16 will also be increased. When the pressure of fluid in the chamber 16 and acting on diaphragm 14 has been increased to some predetermined low degree it will overcome the biasing effect of the toggle spring 26 and cause the diaphragm 14, diaphragm stem 20 and slide valve 22 to return to the position in which they are shown in the drawing. Continued increase in brake pipe pressure will, in the usual manner, eventually cause the operating parts of the brake controlling valve device 1 to return to their normal release positions, thus automatically restoring the apparatus for normal operation.

Having now described my invention what I claim as new and desire to secure by Letters Patent, is:

1. In a release valve device of the type constructed and arranged for interposition in a fluid conducting communication leading from the brake controlling valve device to the brake cylinder of a fluid pressure brake apparatus, said valve device comprising in combination, a valve having an open position and a closed position interposed in said communication, said valve being responsive to the pressure of fluid supplied by said brake controlling valve device to said brake cylinder for moving said valve to its open position, fluid pressure means responsive to the pressure of fluid supplied by said brake controlling valve device to said brake cylinder for actuating said valve to, and for maintaining it in, its closed position, and manually operative means having a normal position in which said fluid pressure means is rendered ineffective to actuate said valve to its closed position and movable to another position in which the fluid pressure means is rendered effective to actuate said valve to its closed position and to vent the brake cylinder.

2. In a release valve device of the type constructed and arranged for interposition in a fluid conducting communication leading from the brake controlling valve device to the brake cylinder of a fluid pressure brake apparatus, said valve device comprising in combination, a valve having an open position and a closed position interposed in said communication, said valve being responsive to the pressure of fluid supplied by said brake controlling valve device to said brake cylinder for moving said valve to its open position, fluid pressure means responsive to the pressure of fluid supplied by said brake controlling valve device to said brake cylinder for actuating said valve to, and for maintaining it in, its closed position, means having a normal position in which said fluid pressure means is rendered ineffective to actuate said valve to its closed position and movable to another position in which the fluid pressure means is rendered effective to actuate said valve to its closed position and to vent the brake cylinder, and manually operative means for actuating said means from said normal position to said other position.

3. In a release valve device of the type constructed and arranged for interposition in a fluid conducting communication leading from the brake controlling valve device to the brake cylinder of a fluid pressure brake apparatus, said valve device comprising in combination, a valve having an open position and a closed position interposed in said communication, said valve being responsive to the pressure of fluid supplied by said brake controlling valve device to said brake cylinder for moving said valve to its open position, fluid pressure means responsive to the pressure of fluid supplied by said brake controlling valve device to said brake cylinder for actuating said valve to, and for maintaining it in, its closed position, means having a normal position in which said fluid pressure means is rendered ineffective to actuate said valve to its closed position and movable to another position in which fluid pressure means is rendered effective to actuate said valve to its closed position and to vent the brake cylinder, manually operative means for actuating said means from said normal position to said other position, and means operative to effect movement of said first mentioned means from said other position to said normal position.

4. In a release valve device of the type constructed and arranged for interposition in a fluid conducting communication leading from the brake controlling valve device to the brake cylinder of a fluid pressure brake apparatus, said valve device comprising in combination, a valve having an open position and a closed position interposed in said communication, said valve being responsive to the pressure of fluid supplied by said brake controlling valve device to said brake cylinder for moving said valve to its open position, fluid pressure means responsive to the pressure of fluid supplied by said brake controlling valve device to said brake cylinder for actuating said valve to, and for maintaining it in, its closed position, means having a normal position in which said fluid pressure means is rendered ineffective to actuate said valve to its closed position and movable to another position in which the fluid pressure means is rendered effective to actuate said valve to its closed position and to vent the brake cylinder, means responsive to fluid under pressure for urging said first mentioned means to said normal position, and manually operative means for moving the first mentioned means from said normal position to said other position.

5. In a release valve device of the type constructed and arranged for interposition in a fluid conducting communication leading from the brake controlling valve device to the brake cylinder of a fluid pressure brake apparatus, said valve device comprising in combination, a valve having an open position and a closed position interposed in said communication, said valve being responsive to the pressure of fluid supplied by said brake controlling valve device to said brake cylinder for moving said valve to its open position, fluid pressure means responsive to the pressure of fluid supplied by said brake controlling valve device to said brake cylinder for actuating said valve to, and for maintaining it in, its closed position, means having a normal position in which said fluid pressure means is rendered ineffective to actuate said valve to its closed position and movable to another position in which the fluid pressure means is rendered effective to actuate said valve to its closed position and to vent the brake cylinder, a chamber, control means manually operable for actuating said means from said normal position to said other position, and restoring means operative upon an increase in the pressure of fluid in said chamber for actuating said means from said other position to said normal position.

6. In a release valve device of the type constructed and arranged for interposition in a fluid conducting communication leading from the brake controlling valve device to the brake cylinder of a fluid pressure brake apparatus, said valve device comprising in combination, a valve having one position in which said communication is open and movable to another position in which said communication is closed, a restricted passage and a relatively unrestricted passage having a combined flow area sufficient to provide the normal rate of increase in the brake cylinder pressure, a first valve interposed in said restricted passage, a second valve interposed in said relatively unrestricted passage, both said first and said second valves having an open position in which fluid under pressure supplied by the brake controlling valve device flows to the brake cylinder, and a closed position in which the flow of fluid under pressure from the brake controlling valve device to the brake cylinder is cut off, said first valve being operative in its closed position to establish a communication through which fluid under pressure in the brake cylinder is vented and to effect operation of said second valve to its closed position, and manually operative means for actuating said first valve to its closed position.

7. A release valve mechanism for interposition in a fluid conducting communication leading from the brake controlling valve device to the brake cylinder of a fluid pressure brake, said valve comprising in combination, valve means including a slide valve for controlling a relatively small flow area passage through which fluid under pressure may flow to and from the brake cylinder, and a valve for controlling a relatively large flow area passage through which fluid under pressure may flow only from the brake controlling valve device to the brake cylinder, said slide valve being operative to cut off the flow of fluid under pressure from the brake controlling valve device to the brake cylinder through the relatively small flow area passage, to establish a communication through which fluid under pressure in the brake cylinder may be vented, and to effect operation of said valve to cut off the flow of fluid under pressure from the brake controlling valve device to the brake cylinder through the relatively large flow area passage; and means manually operative to effect operation of said slide valve.

8. A release valve mechanism for interposition in a fluid conducting communication leading from the brake controlling valve device to the brake cylinder of a fluid pressure brake, said valve comprising in combination, a passage of relatively small flow area through which fluid under pressure may flow from the brake controlling valve device to the brake cylinder, a slide valve interposed in said passage, said slide valve having one position for opening said passage and movable to another position for closing said passage and for establishing a communication through which fluid under pressure is vented from the brake cylinder, a conduit of relatively large flow area through which fluid under pressure may also flow from the brake controlling valve device to the brake cylinder, a valve interposed in said conduit said valve being movable to a position for cutting off the flow of fluid under pressure from the brake controlling valve device to the brake cylinder, means effective upon operation of said slide valve to said other position for actuating said valve, to and for maintaining it in, the position for cutting off the flow of fluid under pressure from the brake controlling valve device to the brake cylinder, and manually operative means for actuating said slide valve from said one position to said other position.

9. A release valve mechanism for interposition in a fluid conducting communication leading from the brake controlling valve device to the brake cylinder of a fluid pressure brake, said valve comprising in combination, a conduit of relatively large flow area through which fluid under pressure may flow from the brake controlling valve device to the brake cylinder; a valve interposed in said conduit for inhibiting back flow of fluid from the brake cylinder to the brake controlling valve device, fluid pressure means responsive to fluid under pressure supplied thereto for actuating said valve to a position for cutting off the flow of fluid under pressure from the brake controlling valve device to the brake cylinder, a passage of relatively small flow area through which fluid under pressure may also flow from the brake controlling valve device to the brake cylinder, a slide valve interposed in said passage, said slide valve having a normal position for maintaining said passage open and movable to another position for cutting off the flow of fluid under pressure through said passage and for establishing a first communication through which fluid under pressure is vented from the brake cylinder and a second communication through which fluid under pressure is supplied to said fluid pressure means, and rocking means manually operative to actuate said slide valve from said normal position to said other position.

10. A release valve mechanism for interposition in a fluid conducting communication leading from the brake controlling valve device to the brake cylinder of a fluid pressure brake, said valve comprising in combination, a passage of relatively small flow area through which fluid under pressure may flow from the brake controlling valve device to the brake cylinder, a slide valve interposed in said passage, said slide valve having one position for opening said passage and movable to another position for closing said passage and for establishing a communication through which fluid under pressure is vented from the brake cylinder, a conduit of relatively large flow area through which fluid under pressure may also flow from the brake controlling valve device to the brake cylinder, a valve interposed in said conduit said valve being movable to a position for cutting off the flow of fluid under pressure from the brake controlling valve device to the brake cylinder, a movable abutment operative to actuate said valve to, and to maintain it in, the position for cutting off the flow of fluid under pressure from the brake controlling valve device to the brake cylinder, said movable abutment being rendered operative upon movement of said slide valve from said one position to said other position, and manually operative means for actuating said slide valve from said one position to said other position.

11. A release valve mechanism for interposition in a fluid conducting communication leading from the brake controlling valve device to the brake cylinder of a fluid pressure brake, said valve comprising in combination, a passage of relatively small flow area through which fluid under pressure may flow from the brake controlling valve device to the brake cylinder, a slide valve interposed in said passage, said slide valve having one position for opening said passage and movable to another position for closing said passage and for establishing a communication through which fluid under pressure is vented from the brake cylinder, a conduit of relatively large flow area through which fluid under pressure may also flow from the brake controlling valve device to the brake cylinder, a valve interposed in said conduit, said valve being movable to a position for cutting off the flow of fluid under pressure from the brake controlling valve device to the brake cylinder, means responsive to an increase in fluid under pressure for actuating said valve to, and for maintaining it in, its cutting off position, a passage of relatively small flow area through which fluid under pressure may also flow from the brake controlling valve device to the brake cylinder, a slide valve interposed in said passage, said slide valve having a normal position for maintaining said passage open and movable to another position for cutting off the flow of fluid under pressure through said passage and for establishing a first communication through which fluid under pressure is vented from the brake cylinder and a second communication through which fluid under pressure is supplied to said means, and manually operative means for actuating said slide valve from said normal position to said other position.

12. A release valve mechanism for interposition in a fluid conducting communication leading from the brake controlling valve device to the brake cylinder of a fluid pressure brake, said valve comprising in combination, a passage of relatively small flow area through which fluid under pressure may flow from the brake controlling valve device to the brake cylinder, a slide valve interposed in said passage, said slide valve having one position for opening said passage and movable to another position for closing said passage and for establishing a communication through which fluid under pressure is vented from the brake cylinder, a conduit of relatively large flow area through which fluid under pressure may also flow from the brake controlling valve device to the brake cylinder, a valve interposed in said conduit said valve being movable to a position for cutting off the flow of fluid under pressure from the brake controlling valve device to the brake cylinder, a conduit of relatively large flow area through which fluid under pressure may flow from the brake controlling valve device to the brake cylinder, a valve interposed in said conduit, said valve being movable to a position for cutting off the flow of fluid under pressure from the brake controlling valve device to the brake cylinder, means responsive to an increase in fluid under pressure for actuating said valve to, and for maintaining it in, its cutting off position, a passage of relatively small flow area through which fluid under pressure may also flow from the brake controlling valve device to the brake cylinder, a slide valve interposed in said passage, said slide valve having a normal position for maintaining said passage open and movable to another position for cutting off the flow of fluid under pressure through said passage and for establishing a first communication through which fluid under pressure is vented from the brake cylinder and a second communication through which fluid under pressure is supplied to said means, manually operative means for actuating said slide valve from said normal position to said other position, and means responsive to an increase in fluid under pressure for effecting movement of said slide valve from said other position to said normal position.

13. In a brake cylinder release valve device for interposition in a fluid conducting communication leading from the brake controlling valve device to the brake cylinder of a fluid pressure brake apparatus and of the type comprising slide valve having one position for opening said communication and another position for closing said communication and for venting fluid under pressure from the brake cylinder, in combination, a conduit through which fluid under pressure also flows from the brake controlling valve device to the brake cylinder, a valve interposed in said conduit and operative by brake cylinder pressure to prevent back flow of fluid under pressure from the brake cylinder to the brake controlling valve device, means operative by the pressure of fluid supplied by the brake controlling valve device to the brake cylinder when said valve is in said other position for actuating said valve to, and for maintaining it in, a position for cutting the flow of fluid under pressure from the brake controlling valve device through said conduit, manually operative means for actuating said slide valve from said one position to said other position, and means responsive to an increase in fluid under pressure for effecting movement of said slide valve from said other position to said normal position.

SIDNEY G. DOWN.